J. B. SMITH.
Coffee Pot.

No. 85,339. Patented Dec. 29, 1868.

Witnesses:
Chas O Smith
H. S. Look

Inventor:
J. B. Smith

United States Patent Office.

J. B. SMITH, OF MILWAUKEE, WISCONSIN, ASSIGNOR TO HIMSELF AND GEORGE R. CHITTENDEN, OF CHICAGO, ILLINOIS.

Letters Patent No. 85,339, dated December 29, 1868.

---

IMPROVEMENT IN COFFEE-POTS.

---

The Schedule referred to in these Letters Patent and making part of the same.

---

*To all whom it may concern:*

Be it known that I, J. B. SMITH, of the city of Milwaukee, and State of Wisconsin, have invented a new and useful Improvement in Steam Coffee-Pots; and I do hereby declare that the following is a full, clear, and exact description thereof, which will enable those skilled in the art to make and use the same, reference being had to the accompanying drawing, forming part of this specification, in which—

Figure 1:
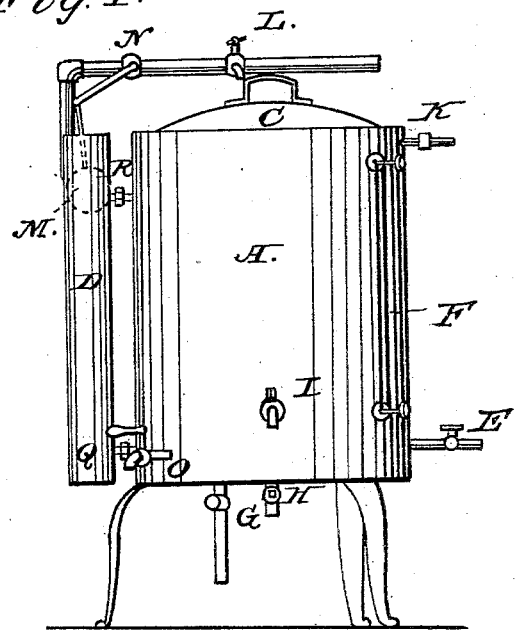
Figure 2:
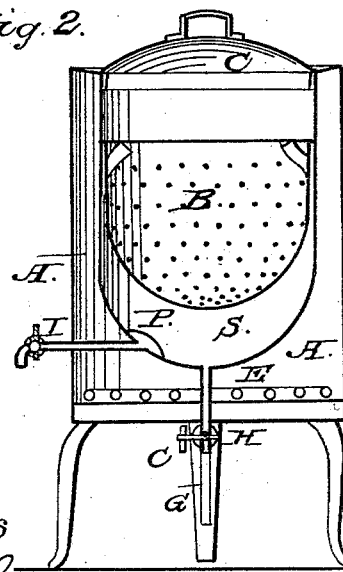

Figure 1 is a perspective view of my invention; and
Figure 2, a vertical sectional view.

Similar letters of reference in each of the figures indicate corresponding parts.

The object of my invention is to produce a coffee-pot for hotels, restaurants, and other places, to be heated by steam, and to make coffee in a superior manner.

A is the water-receptacle.

B, a strainer, inside the water-receptacle, to hold the coffee.

C, the cover.

D, a reservoir for the supply of water to the water-receptacle.

E, the steam-pipe, which passes into the water-receptacle and lies in a coil on its bottom.

F, a glass gauge, to show the height of the coffee in the coffee-receptacle.

G, cock in steam-pipe leaving the water-receptacle.

H, a discharge-pipe from the coffee-receptacle, to clean it out with.

I, pipe and cock to draw off coffee from the coffee-receptacle.

K, waste-water and steam-pipe.

L, cock in the supply-pipe, from which to draw water into the coffee-receptacle S.

M, a float in the reservoir D, to regulate the height of water in the water-receptacle A. When too low, it drops and opens the stop-cock N; when high enough, it rises and closes the stop-cock N.

N, stop-cock in the pipe which supplies water both to the water-receptacle and to the coffee-pot.

O, pipe and cock to draw off the water from the water-receptacle A.

P, strainer over the pipe I in the coffee-pot.

Q, pipe from the bottom of reservoir D to the water-receptacle A.

R, pipe from the top of reservoir D to the water-receptacle A.

S, the coffee-pot where the coffee is made.

Operation.

Put such quantity of coffee as is desired in the strainer B, and set the strainer in coffee-pot S. Then let water into the water-receptacle till the float M will close the stop-cock N. Then draw from pipe, by means of cock L, water sufficient to make the quantity of coffee required. Then put on cover C. Then open cock E and let on the steam, open cock G to let the air out of the pipe, and keep it open sufficient to give a current of steam through the pipe till the water boils, which will be in a very few minutes. Keep the water boiling for some twenty minutes, when the coffee will be cooked. Then you can close cock G, and let it stand, or keep the water boiling in the water-receptacle.

The water in the coffee-pot S will not boil as long as the water and steam-pipe K is open.

What I claim as my invention, and desire to secure by Letters Patent, is—

1. Water reservoir A, coffee-pot S, and steam-pipe E, substantially as described.

2. Reservoir D, with float M and cock N, in combination with reservoir A, substantially as described.

3. Reservoir A, strainer B, gauge F, and coffee-pot S, combined, substantially as described.

J. B. SMITH.

Witnesses:
CHAS. A. SMITH,
H. S. LOAK.